(12) United States Patent
Anson et al.

(10) Patent No.: US 9,436,828 B2
(45) Date of Patent: Sep. 6, 2016

(54) SYSTEMS AND METHODS FOR COMMAND-BASED ENTRY INTO BASIC INPUT/OUTPUT SYSTEM SETUP FROM OPERATING SYSTEM

(71) Applicant: Dell Products L.P., Round Rock, TX (US)

(72) Inventors: Douglas M. Anson, Dripping Springs, TX (US); Charles D. Robison, Round Rock, TX (US); David Konetski, Austin, TX (US); Frank H. Molsberry, Georgetown, TX (US); Anand Joshi, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/736,967

(22) Filed: Jun. 11, 2015

(65) Prior Publication Data
US 2015/0278525 A1    Oct. 1, 2015

Related U.S. Application Data

(63) Continuation of application No. 13/746,979, filed on Jan. 22, 2013, now Pat. No. 9,081,965.

(51) Int. Cl.
*G06F 9/00* (2006.01)
*G06F 15/177* (2006.01)
(Continued)

(52) U.S. Cl.
CPC ........... *G06F 21/575* (2013.01); *G06F 9/4401* (2013.01)

(58) Field of Classification Search
CPC .............................. G06F 21/575; G06F 9/4401
USPC .............................................................. 713/2
See application file for complete search history.

(56) References Cited

U.S. PATENT DOCUMENTS

| 2006/0184794 A1* | 8/2006 | Desselle ............... G06F 21/575 713/166 |
| 2009/0210689 A1 | 8/2009 | Harmer |
| 2010/0058066 A1* | 3/2010 | Wang ...................... G06F 21/80 713/183 |

(Continued)

OTHER PUBLICATIONS

Sinofsky, Steven, Designing for PCs that boot faster than ever before, retrieved from <http://blogs,msdn.com/b/b8/archive/2012/05/22/designing-for-pcs-that-boot-faster-than-ever-before.aspx> last retrieved on Dec. 28, 2015.*

(Continued)

*Primary Examiner* — Robert Cassity
(74) *Attorney, Agent, or Firm* — Jackson Walker L.L.P.

(57) ABSTRACT

In accordance embodiments of the present disclosure, a method may include, during execution of an operating system on an information handling system and responsive to a user input indicating a desire to invoke a basic input/output system (BIOS) setup program for configuring a BIOS, prompting for and receiving user-provided credentials via a user interface communicatively coupled to the processor. The method may also include, during execution of the operating system, passing BIOS credentials to the BIOS based on the user-provided credentials. The method may additionally include, during execution of the operating system determining, by the BIOS, if the BIOS credentials are valid. The method may further include, responsive to determining that the BIOS credentials are valid, setting a flag to a value indicating that the BIOS setup program is to be invoked on a subsequent boot of the information handling system.

17 Claims, 1 Drawing Sheet

(51) Int. Cl.
*G06F 21/57* (2013.01)
*G06F 9/44* (2006.01)

(56) References Cited

U.S. PATENT DOCUMENTS

2011/0067025 A1* 3/2011 Cragun ............... G06F 9/45512
 718/100

2013/0166895 A1* 6/2013 Cui ....................... G06F 9/4401
 713/2

OTHER PUBLICATIONS

Sinofsky, Steven, Designing for PCs that boot faster than ever before, retrieved from <http://blogs.msdn.com/b/b8/archive/2012/05/22/desgining-for-pcs-that-boot-baster-than-ever-before.spx> last retrieved on Jan. 7, 2015.

* cited by examiner

SYSTEMS AND METHODS FOR COMMAND-BASED ENTRY INTO BASIC INPUT/OUTPUT SYSTEM SETUP FROM OPERATING SYSTEM

The present patent application is a continuation of a previously filed patent application, U.S. patent application Ser. No. 13/746,979, filed Jan. 22, 2013, the entirety of which is hereby incorporated by reference.

TECHNICAL FIELD

The present disclosure relates in general to information handling systems, and more particularly to invoking basic input/output system (BIOS) setup of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A key component of almost every information handling system is the basic input/output system (BIOS). A BIOS may be a system, device, or apparatus configured to identify, test, and/or initialize one or more information handling resources of an information handling system, typically during boot up or power on of an information handling system. A BIOS may include boot firmware configured to be the first code executed by a processor of an information handling system when then information handling system is booted and/or powered on. As part of its initialization functionality, BIOS code may be configured to set components of the information handling system into a known state, so that one or more applications (e.g., an operating system or other application programs) stored on compatible media may be executed by a processor and given control of the information handling system and its various components.

Oftentimes, various settings and parameters associated with a BIOS may be user-configurable, such that a user of an information handling system can configure or customize behavior of the BIOS and/or information handling resources of the information handling system. Historically, a user could configure BIOS settings by invoking a BIOS setup program by entering a specified keystroke (e.g., a "hotkey") during boot of the information handling system but before loading and execution of an operating system. However, operating system publishers and information handling system manufacturers are increasingly moving toward "fast boot" operating systems, in which the delay between powering on of an information handling system and execution of an operating system is such a small duration that a user may not have sufficient opportunity to enter a keystroke necessary to invoke BIOS setup. While such fast boot approach may improve user experience for normal operation of the information handling system, it presents a challenge to the user in invoking BIOS set up.

SUMMARY

In accordance with the teachings of the present disclosure, the disadvantages and problems associated with invocation of BIOS setup have been reduced or eliminated.

In accordance with embodiments of the present disclosure, an information handling system may include a processor and an operating system comprising one or more instructions embodied in computer-readable media communicatively coupled to the processor. The instructions may be configured to cause the processor to: (i) responsive to a user input indicating a desire to invoke a basic input/output system (BIOS) setup program for configuring a BIOS, prompt for and receive user-provided credentials via a user interface communicatively coupled to the processor; and (ii) pass BIOS credentials to the BIOS based on the user-provided credentials. The information handling system may also include the BIOS, the BIOS comprising one or more instructions embodied in computer-readable media communicatively coupled to the processor. The instructions may cause the processor to: (i) determine if the BIOS credentials are valid; (ii) responsive to determining that the BIOS credentials are valid, set a flag to a value indicating that the BIOS setup program is to be invoked on a subsequent boot of the information handling system; (iii) during a boot of the information handling system, determine the value of the flag; (iv) during the boot and responsive to determining that value of the flag is set, invoke the BIOS setup program prior to loading and executing an operating system on the processor; and (v) during the boot and responsive to determining that value of the flag is not set, load and execute the operating system without invoking the BIOS setup program.

In accordance with these and other embodiments of the present disclosure, a method may include, during execution of an operating system on an information handling system and responsive to a user input indicating a desire to invoke a basic input/output system (BIOS) setup program for configuring a BIOS, prompting for and receiving user-provided credentials via a user interface communicatively coupled to the processor. The method may also include, during execution of the operating system, passing BIOS credentials to the BIOS based on the user-provided credentials. The method may additionally include, during execution of the operating system determining, by the BIOS, if the BIOS credentials are valid. The method may further include, responsive to determining that the BIOS credentials are valid, setting a flag to a value indicating that the BIOS setup program is to be invoked on a subsequent boot of the information handling system.

Technical advantages of the present disclosure will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
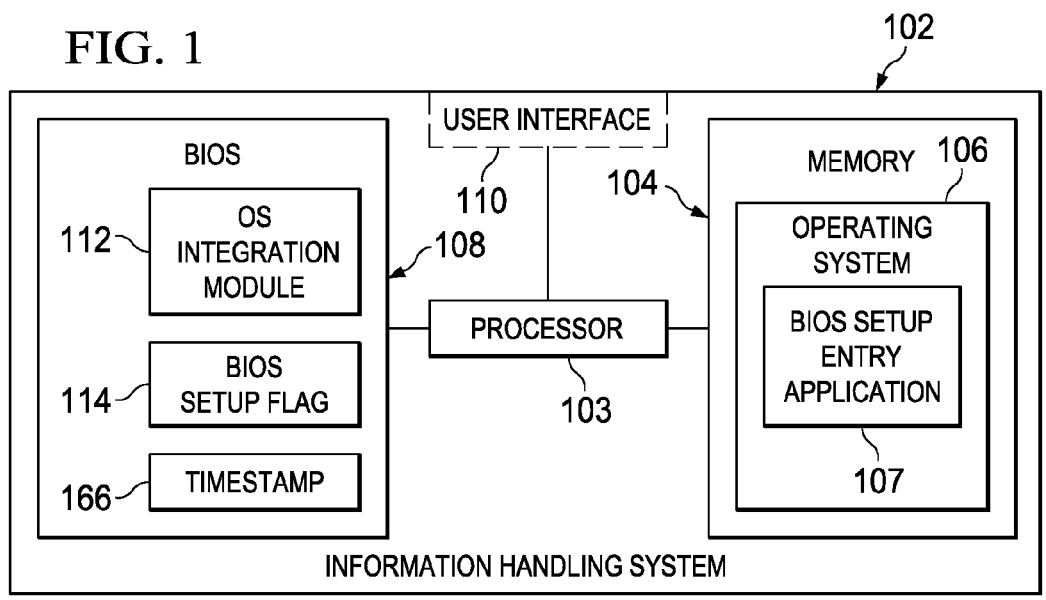
FIG. 1 illustrates a block diagram of an example information handling system, in accordance with certain embodiments of the present disclosure.
Figure 2:
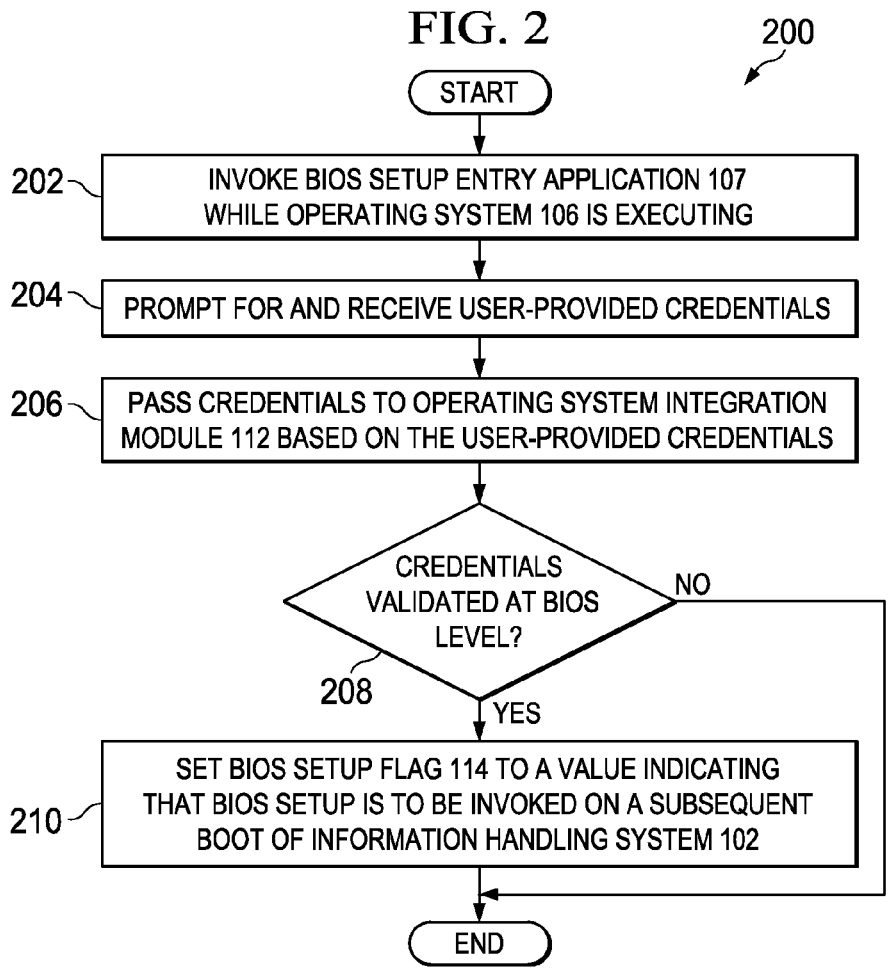
FIG. 2 illustrates a flow chart of an example method for invoking BIOS setup in an information handling system, in accordance with certain embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more busses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, busses, memories, I/O devices and/or interfaces, storage resources, network interfaces, motherboards, and/or any other components and/or elements of an information handling system.

FIG. 1 illustrates a block diagram of an example information handling system 102, in accordance with certain embodiments of the present disclosure. In other embodiments, information handling system 102 may be a personal computer (e.g., a desktop computer, a laptop, notebook, tablet, handheld, smart phone, personal digital assistant, etc.). As depicted in FIG. 1, information handling system 102 may include a processor 103, a memory 104 communicatively coupled to processor 103, a basic input/output system (BIOS) 110 communicatively coupled to processor 103, and a user interface 110 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, BIOS 108, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have operating system 106 stored thereon. Operating system 106 may be any program of executable instructions, or aggregation of programs of executable instructions, configured to manage and/or control the allocation and usage of hardware resources (e.g., processor 103, memory 104, user interface 110, and/or other information handling resources) and provide an interface between such hardware resources and application programs hosted by operating system 106, and thus may act as a host for application programs to be executed by information handling system 102. Active portions of operating system 106 may be read and executed by processor 103 in order to carry out the functionality of operating system 106. Examples of operating system 106 may include, without limitation, Windows, MacOS, UNIX, LINUX, Android, iOS, or any other closed or open source operating system.

As depicted in FIG. 1, operating system 106 may include BIOS setup entry application 107. As described in greater detail elsewhere in this disclosure, BIOS setup entry application 107 may, while operating system 106 is actively executing on information handling system 102 and operating in concert with operating system integration module 112, set BIOS setup flag 114 responsive to user input in order to cause invocation of BIOS setup upon a subsequent reboot of information handling system 102.

BIOS 108 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 108 may be implemented as a program of instructions that may be read by and executed on processor 103 to carry out the functionality of BIOS 108. In these and other embodiments, BIOS 108 may comprise boot firmware configured to be the first code executed by processor 103 when information handling system 102 is booted and/or powered on. As part of its initialization functionality, BIOS code may be configured to set components of information handling system 102 into a known state, so that one or more applications (e.g., operating system 106 or other application programs) stored on compatible media (e.g., memory 104) may be executed by processor 103 and given control of information handling system 102.

As shown in FIG. 1, BIOS 108 may include operating system integration module 112. As described in greater detail elsewhere in this disclosure, operating system integration module 112 may include any system, device, or apparatus configured to, while operating system 106 is actively executing on information handling system 102 and operating in concert with BIOS setup entry application 107, set BIOS setup flag 114 responsive to user input in order to cause invocation of BIOS setup upon a subsequent reboot of information handling system 102. In some embodiments, operating system integration module 112 may be implemented as a program of instructions that may be read by and executed on processor 103 to carry out the functionality of operating system integration module 112.

BIOS setup flag 114 may be a variable of data stored in computer-readable media of BIOS 108 or accessible to BIOS 108 that indicates whether a BIOS setup application should be invoked upon a reboot of information handling system 102.

In some embodiments, operating system integration module 112 may also store a timestamp 116 associated with BIOS setup flag 114 indicative of the time at which BIOS setup flag 114 was set to the value indicating that BIOS setup is to be invoked on a subsequent boot of information handling system 102.

User interface 110 may comprise any instrumentality or aggregation of instrumentalities by which a user may interact with information handling system 102. For example, user interface 110 may permit a user to input data and/or instructions into information handling system 102, and/or otherwise manipulate information handling system 102 and its associated components. User interface 110 may also permit information handling system 102 to communicate data to a user, e.g., by way of a display device. In some embodiments, user interface 110 may include a biometric input device (e.g., fingerprint scanner, retinal scanner, camera, microphone, etc.).

In addition to processor 103, memory 104, BIOS 108, and user interface 110 information handling system 102 may include one or more other information handling resources.

In operation, while operating system 106 is executing on information handling system 102, a user may invoke BIOS setup entry application 107 by inputting the proper command (e.g., command-line command, double-clicking of an icon, etc.). Once invoked, BIOS setup entry application 107 may prompt a user (e.g., via user interface 110) for credentials (e.g., username, password, fingerprint, iris scan, picture of face for facial recognition, spoken utterance for voice recognition, other biometric data, etc.) that the user may enter via user interface 110.

In some embodiments, the user-provided credentials may be in a format that may be processed by BIOS 108 (e.g., username and password). In such embodiments, BIOS setup entry application 107 may pass such user-provided credentials to BIOS 108 for validation.

In other embodiments, the user-provided credentials may not be in a format that may be processed by BIOS 108 (e.g., biometric data). In such case, BIOS setup entry application 107 or another application executing on operating system 106 may compare the user-provided credentials to a credentials database associated with operating system 106 in order to validate such credentials. If such user-provided credentials are validated at the operating system level, BIOS setup entry application 107 may pass BIOS-capable credentials to BIOS 108 for further validation of such credentials. As a specific example, BIOS setup entry application 107 or another application executing on operating system 106 may maintain a database, table, map, or other data structure whose entries may be indexed by user-provided biometric credentials. Based on inputted biometric credentials, BIOS setup entry application 107 may look up an entry in such database, wherein such entry includes BIOS-capable credentials associated with the user having matching biometric credentials. In this example, it is such BIOS-capable credentials associated with the user having biometric credentials matching those inputted that may be passed to BIOS 108 from BIOS setup entry application 107.

In either case, any credentials may be validated as originating from a trusted source and/or creator, and may thus be digitally signed or encrypted (e.g., using an appropriate key of a key pair for which the other key of the key pair may facilitate verification of the digital signature or decryption). For example, BIOS setup entry application 107 may digitally sign credentials to be communicated to BIOS 108, and OS integration module 112 may validate such digital signature.

Upon receipt of credentials from BIOS setup entry application 107, operating system integration module 112 may validate such credentials. If such credentials are validated at the BIOS level, operating system integration module 112 may set BIOS setup flag 114 to a value indicating that BIOS setup is to be invoked on a subsequent boot of information handling system 102. When information handling system 102 boots and BIOS 108 executes, prior to loading and execution of operating system 106, BIOS 108 may determine whether BIOS setup flag 114 is set. If BIOS setup flag 114 is set, BIOS 108 may proceed to invoke the BIOS setup program to allow the user to configure BIOS 108. If BIOS setup flag 114 is not set, BIOS 108 may executed as normally, and operating system 106 may be loaded and executed without invocation of BIOS setup. In some embodiments, BIOS 108 may also examine timestamp 116 associated with BIOS setup flag 114, and permit invocation of the BIOS setup program only if the timestamp indicates that the BIOS setup flag 114 was written within a particular period of time before the then-present boot of information handling system 102.

In any case, BIOS setup flag 114 may be validated as originating from a trusted source and/or creator and may thus be digitally signed or encrypted (e.g., using an appropriate key of a key pair for which the other key of the key pair may be used by a BIOS setup application to facilitate verification of the digital signature or decryption). For example, OS integration module 112 may digitally sign BIOS setup flag 114, and the BIOS setup program may validate such digital signature upon a subsequent boot.

FIG. 2 illustrates a flow chart of an example method 200 for invoking BIOS setup in an information handling system (e.g., information handling system 102), in accordance with certain embodiments of the present disclosure. According to one embodiment, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, while operating system 106 is executing on information handling system 102, a user may invoke BIOS setup entry application 107 by inputting the proper command. Once invoked, BIOS setup entry application 107 at step 204 may prompt the user (e.g., via user interface 110) for credentials (e.g., username, password, fingerprint, iris scan, picture of face for facial recognition, spoken utterance for voice recognition, other biometric data, etc.) that the user may enter via user interface 110.

At step 206, BIOS setup entry application 107 may pass credentials to operating system integration module 112 based on the user-provided credentials. The user-provided credentials may be in a format that may be processed by BIOS 108 (e.g., username and password) in which case, BIOS setup entry application 107 may pass such user-provided credentials to BIOS 108 for validation. Otherwise, if the user-provided credentials are not in a format that may be processed by BIOS 108 (e.g., biometric data), BIOS setup entry application 107 may pass BIOS-capable credentials to operating system integration module 112 based on the user-provided credentials, as described in greater detail above.

At step 208, upon receipt of credentials from BIOS setup entry application 107, operating system integration module 112 may validate such credentials. If such credentials are validated at the BIOS level, method 200 may proceed to step 210. Otherwise, method 200 may end.

At step 210, in response to validation of credentials, operating system integration module 112 may set BIOS setup flag 114 to a value indicating that BIOS setup is to be invoked on a subsequent boot of information handling system 102. In some embodiments, operating system integration module 112 may also store a timestamp 116 associated with BIOS setup flag 114 indicative of the time at which BIOS setup flag 114 was set to the value indicating that BIOS setup is to be invoked on a subsequent boot of information handling system 102. After completion of step 210, method 200 may end.

As mentioned above, BIOS setup flag 114 may be employed by BIOS 108 upon a boot of information handling system 102 and before loading and execution of operating handling system 102 to determine whether or not to invoke a BIOS setup program allowing the user to configure BIOS settings. If BIOS setup flag 114 is set, BIOS 108 may, upon a boot of information handling system 102, invoke the BIOS setup program prior to loading and executing operating system 106. Otherwise, BIOS 108 may load and execute operating system 106 without invoking the BIOS setup program if BIOS setup flag 114 is not set. In some embodiments, BIOS 108 may also examine timestamp 116 associated with BIOS setup flag 114, and permit invocation of the BIOS setup program only if the timestamp indicates that the BIOS setup flag 114 was written within a particular period of time before the then-present boot of information handling system 102.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

Although the present disclosure has been described in detail, it should be understood that various changes, substitutions, and alterations can be made hereto without departing from the spirit and the scope of the disclosure as defined by the appended claims.

What is claimed is:

1. An information handling system comprising:
a processor; and
an operating system comprising one or more instructions embodied in non-transitory computer-readable media communicatively coupled to the processor, the instructions for causing the processor to, when read and executed by the processor:
responsive to a user input indicating a desire to invoke a basic input/output system (BIOS) setup program for configuring a BIOS;
prompt for and receive user-provided credentials via a user interface communicatively coupled to the processor;
pass BIOS credentials to the BIOS based on the user-provided credentials; and
responsive to determining that the BIOS credentials are valid:
set a BIOS setup program flag indicating that the BIOS setup program is to be invoked on a subsequent boot; and
record a timestamp indicative of when the flag was set;
wherein the BIOS is configured to invoke the BIOS setup program prior to loading and executing the operative system responsive to detecting:
the BIOS setup flag is set; and
a most recent boot of the information handling system occurred within a particular interval relative to the time indicated by the timestamp.

2. The information handling system of claim 1, wherein the BIOS credentials comprise the user-provided credentials.

3. The information handling system of claim 1, wherein the user-provided credentials comprise at least one of a username and a password.

4. The information handling system of claim 1, wherein:
the user-provided credentials are in a format which the BIOS cannot process; and
passing the BIOS credentials to the BIOS based on the user-provided credentials comprises passing BIOS credentials in a format in which the BIOS can process to the BIOS based on the user-provided credentials.

5. The information handling system of claim 4, wherein the passing the BIOS credentials to the BIOS based on the user-provided credentials comprises:
indexing a database entry based on the user-provided credentials; and
passing BIOS credentials present in the indexed database entry as the BIOS credentials.

6. The information handling system of claim 1, further comprising:
the BIOS is further configured to, when read and executed by the processor, determine if the BIOS credentials are valid.

7. The information handling system of claim 6, wherein:
the operating system may further cause the processor to digitally sign or encrypt the BIOS credentials; and
the BIOS may further cause the processor to validate a digital signature of the BIOS credentials or decrypt the BIOS credentials.

8. The information handling system of claim 6, wherein:
the BIOS may further cause the processor to digitally sign or encrypt the flag; and
the BIOS setup program may cause the processor to validate the digital signature of the flag or decrypt the flag.

9. The information handling system of claim 6, further comprising the BIOS further configured to:
during a boot of the information handling system and responsive to determining that value of the flag is not set, load and execute the operating system without invoking the BIOS setup program.

10. A method comprising:
during execution of an operating system on an information handling system and responsive to a user input indicating a desire to invoke a basic input/output system (BIOS) setup program for configuring a BIOS, prompting for and receiving user-provided credentials via a user interface communicatively coupled to the processor; and
during execution of the operating system, passing BIOS credentials to the BIOS based on the user-provided credentials; and
responsive to determining that the BIOS credentials are valid:
set a BIOS setup program flag indicating that the BIOS setup program is to be invoked on a subsequent boot; and
record a timestamp indicative of when the flag was set;
wherein the BIOS is configured to invoke the BIOS setup program prior to loading and executing the operating system responsive to detecting:
the BIOS setup flag is set; and
a most recent boot of the information handling system occurred within a particular interval relative to the time indicated by the timestamp.

11. The method of claim 10, further comprising:
responsive to determining that the flag is not set, loading and executing the operating system without invoking the BIOS setup program.

12. The method of claim 10, wherein the user-provided credentials comprise at least one of a username and a password.

13. The method of claim 10, wherein:
the user-provided credentials are in a format which the BIOS cannot process; and
passing the BIOS credentials to the BIOS based on the user-provided credentials comprises passing BIOS credentials in a format in which the BIOS can process to the BIOS based on the user-provided credentials.

14. The method of claim 13, wherein the passing the BIOS credentials to the BIOS based on the user-provided credentials comprises:
indexing a database entry based on the user-provided credentials; and
passing BIOS credentials present in the indexed database entry as the BIOS credentials.

15. The method of claim 10, further comprising:
during execution of the operating system determining, by the BIOS, if the BIOS credentials are valid.

16. The method of claim 15, further comprising:
digitally signing or encrypting the BIOS credentials during execution of the operating system; and
validating a digital signature of the BIOS credentials or decrypting the BIOS credentials by the BIOS.

17. The method of claim 15, further comprising: digitally signing or encrypting the flag by the BIOS during execution of the operating system; and during the subsequent boot, validating the digital signature of the flag or decrypting the flag by the BIOS.

* * * * *

UNITED STATES PATENT AND TRADEMARK OFFICE
CERTIFICATE OF CORRECTION

PATENT NO. : 9,436,828 B2
APPLICATION NO. : 14/736967
DATED : September 6, 2016
INVENTOR(S) : Anson et al.

It is certified that error appears in the above-identified patent and that said Letters Patent is hereby corrected as shown below:

Column 8, Lines 8-36, (approx.), Claim 1 should read as follows:
1. An information handling system comprising:
a processor; and
an operating system comprising one or more instructions embodied in computer-readable media communicatively coupled to the processor, the instructions for causing the processor to, when read and executed by the processor:
responsive to a user input indicating a desire to invoke a basic input/output system (BIOS) setup program for configuring a BIOS:
prompt for and receive user-provided credentials via a user interface communicatively coupled to the processor;
pass BIOS credentials to the BIOS based on the user-provided credentials; and responsive to determining that the BIOS credentials are valid:
set a BIOS setup program flag indicating that the BIOS setup program is to be invoked on a subsequent boot; and
record a timestamp indicative of when the flag was set;
wherein the BIOS is configured to invoke the BIOS setup program prior to loading and executing the operating system responsive to detecting:
the BIOS setup flag is set; and
a most recent boot of the information handling system occurred within a particular interval relative to the time indicated by the timestamp.

Signed and Sealed this
Twenty-fourth Day of January, 2017

Michelle K. Lee
*Director of the United States Patent and Trademark Office*